United States Patent [19]

Gray

[11] 4,269,424
[45] May 26, 1981

[54] SWIVEL LOCK AND TOW BAR ASSEMBLY FOR FOUR-WHEEL CASTER JACK ASSEMBLY

[75] Inventor: Joseph L. Gray, St. Joseph, Mo.

[73] Assignee: Gray Manufacturing Company, Inc., St. Joseph, Mo.

[21] Appl. No.: 60,748

[22] Filed: Jul. 25, 1979

[51] Int. Cl.³ .............................................. B60P 1/44
[52] U.S. Cl. ...................................................... 280/92
[58] Field of Search ............... 280/92, 79.1 A, 79.1 R, 280/480, 491 E, DIG. 2, 4, 6, 81 B, 80 R, 47.11, 86, 221 R, 7.1; 180/19 R, 19 S, 19 H, 92; 114/230, 221 R, 223

[56] References Cited
U.S. PATENT DOCUMENTS

| 122,631 | 1/1872 | Miller | 280/7.1 |
|---|---|---|---|
| 1,175,312 | 3/1916 | Simpson | 280/79.1 A X |
| 3,861,731 | 1/1975 | DeYoung | 114/221 R X |
| 4,168,078 | 9/1979 | Haldimann | 280/79.1 R X |

FOREIGN PATENT DOCUMENTS 322108  5/1957  Switzerland .......................... 280/47.11

Primary Examiner—John J. Love
Assistant Examiner—Norman L. Stack, Jr.

[57] ABSTRACT

By locking one caster wheel of a four-wheel jack against swivelling without inhibiting its ability to roll freely along a supporting surface, and by then steering an oppositely trailing or leading caster wheel with a tow bar or other suitable handle, the jack can be readily steered into tight places and under low overhanging structures even with relatively heavy loads supported thereon as the two remaining caster wheels become effective "slaves" to their respective, most laterally adjacent locked or steered wheels. The tow bar for the steered wheel and the lock for the locked wheel are readily attached to and removed from their respective wheels without the aid of tools or special fasteners.

10 Claims, 6 Drawing Figures

U.S. Patent    May 26, 1981    4,269,424
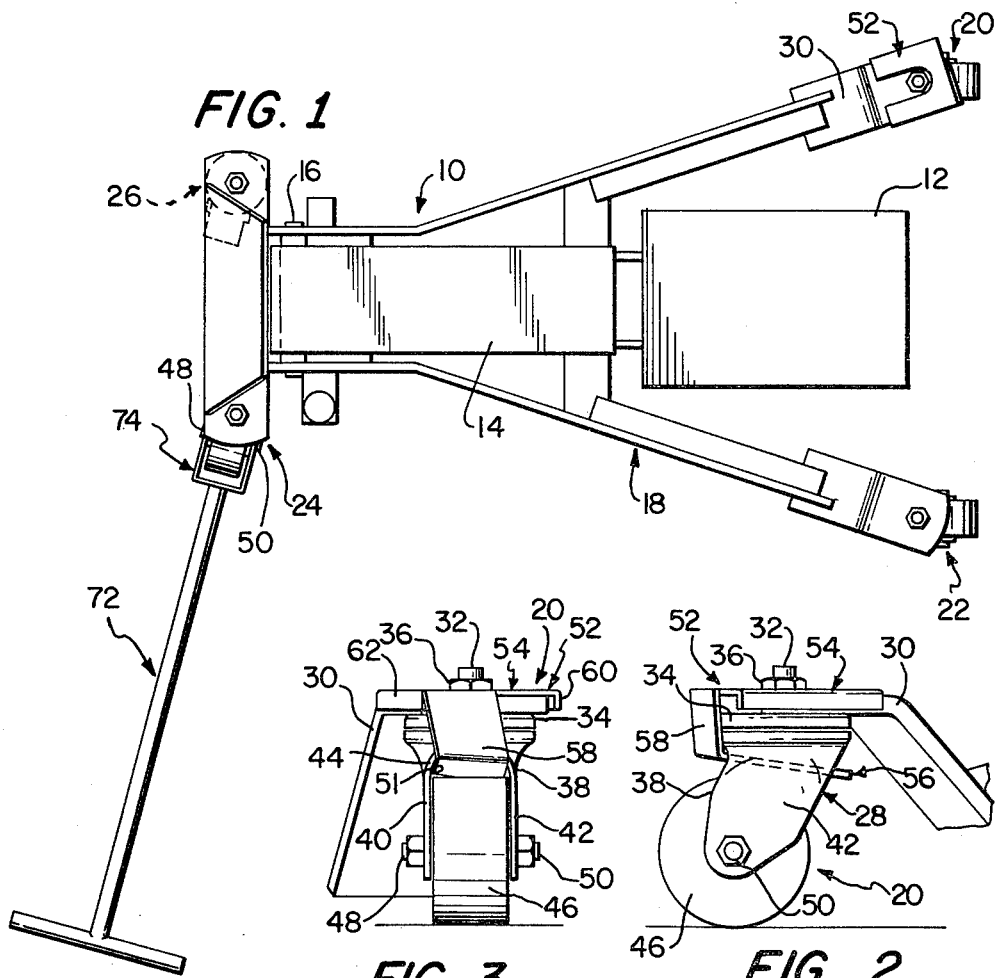
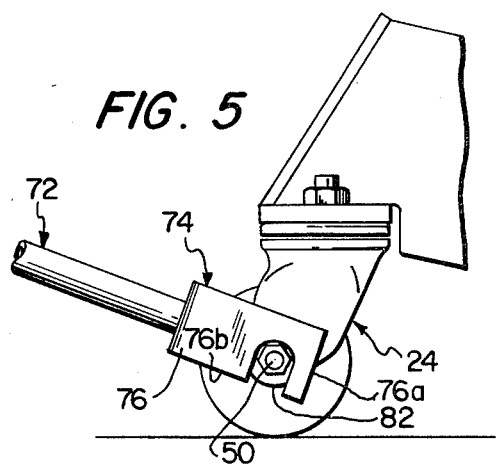
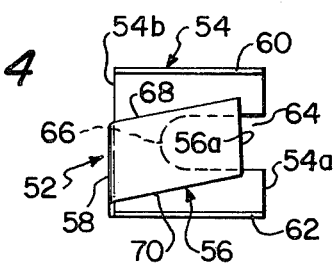
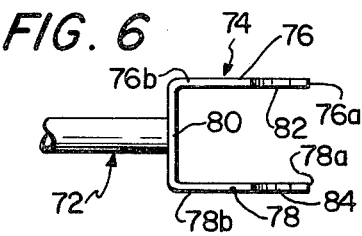

SWIVEL LOCK AND TOW BAR ASSEMBLY FOR FOUR-WHEEL CASTER JACK ASSEMBLY

TECHNICAL FIELD

This invention relates generally to the field of load-carrying devices of the castering-wheel type such as, for example, jacks used in connection with the installation, removal and service of heavy transmissions, differentials and related components from the underside of heavy-duty service trucks and the like.

BACKGROUND ART

Typically, four-wheel jack assemblies adapted for use as above noted are provided with caster wheels which can be swivelled or pivoted in all directions about respective vertical axes, thus enabling the jacks to be moved in any direction. unfortunately, such wheels also have a tendency to swivel on their own accord and independently of each other when floor surface irregularities are encountered, thus tending to make the jacks deviate from their intended path of travel. Furthermore, directional control of the caster wheels is difficult if not impossible unless the motivating force is applied to the jack virtually directly above the wheels.

Jacks of this type are commonly used not only to transport heavy transmissions and the like from one location to another along the shop floor, but also to support and carry such heavy, unwieldy components as they are being unbolted from the underside of the vehicles and subsequently replaced after servicing. The jack must be very precisely located in order to properly receive and support the component as it is released from the truck and, in like fashion, must be very carefully repositioned when the component is reattached because the mounting bolts and their receiving holes require exact alignment before replacement is possible.

Yet achieving the required precise location and maneuvering of such jacks can be a frustrating and time-consuming experience, particularly when it is considered that the mechanic must maneuver the jack with its heavy load in very cramped quarters made even all the more confining because the truck is normally not elevated during service of this type. Consequently, the mechanic finds that he must attempt to precisely manipulate the jack via its long operating handle within a tight space and at a distance fairly remote from the actual load-receiving portion of the jack, making the free-swivelling caster wheels all the more difficult to control as they respond on their own accord to every deviating force applied thereto through surface irregularities and otherwise.

SUMMARY OF THE PRESENT INVENTION

Accordingly, an important object of the present invention is to provide a way of rendering castering-type, four-wheeled, load-carrying devices such as service jacks and the like quickly and easily converted for precision steering and control so as to overcome the problems and shortcomings inherent in the castering devices of present design.

Pursuant to the foregoing, the present invention contemplates the use of a quickly attachable lock to one caster wheel of the jack or other device so as to prevent swivelling of the locked wheel relative to the jack without inhibiting, however, the selected wheel's ability to roll freely over the floor surface. Furthermore, the present invention contemplates the use of a tow bar or handle which can be quickly attached to an oppositely trailing or leading wheel of the device in such a way that the user may manipulate the handle to steer the attached wheel as well as to apply a pushing or towing force to the jack. As a consequence of this arrangement, the wheel laterally adjacent the locked wheel will remain "slaved" to such wheel during movement of the jack in the sense that it will always be oriented in essentially the same direction as the locked wheel while, on the other hand, the remaining wheel laterally adjacent the one steered by the handle will be "slaved" to that steered wheel, turning in whatever direction the steered wheel may be oriented by the handle. The "slave" response occurs as a result of the motion of the jack over the floor. The jack is thus highly steerable and precisely locatable as its caster wheels can no longer free-swivel to unintended positions. Both front and rear "slave" have to reverse when direction of the jack motion reverses. During this transition their direction will align with the direction of the "master" caster (i.e. the locked or steered caster wheel).

BRIEF DESCRIPTION OF THE DRAWING

FIG. 1 is a top plan view of a swivel lock and tow bar assembly constructed in accordance with the principles of the present invention and shown attached to a four-wheel caster jack assembly;

FIG. 2 is an enlarged, fragmentary, elevational view of one caster wheel and its associated lock;

FIG. 3 is an end elevational view thereof;

FIG. 4 is a bottom plan view of the lock removed from its caster wheel;

FIG. 5 is a side elevational view in fragmentary form of the jack and tow bar showing the way in which the latter is attached to the jack; and FIG. 6 is a fragmentary bottom plan view of the tow bar illustrating details of the attaching yoke thereof.

DETAILED DESCRIPTION

The jack 10 shown herein is by way of example only. It is to be understood and will become apparent that the principles of the present invention, while being ideally suited for use in connection with a device such as the jack 10, have substantial utility in connection with other types of four-wheeled, load-carrying devices. Thus, while the description which follows will be carried out in terms of a jack as the device with which the present invention is utilized, it will be remembered that the present invention is to be limited only by the fair scope of the claims which are found at the close of the description.

The jack 10 is provided with a platform 12 upon which relatively heavy components such as truck transmissions and the like may be supported. The platform 12 is, in turn, raised and lowered by lift linkage broadly denoted by the numeral 14 having a horizontal pivot 16 at its inner end with the chassis 18 of the jack 10. Via mechanism not shown, the lift linkage 14 is indeed operable to raise and lower the platform 12 and hold it in any one of a number of selected vertical positions.

The chassis 18 is provided with a set of four caster wheels denoted herein by the numerals 20, 22, 24 and 26 which adapt the chassis 18 for movement along a floor surface. Although that portion of the chassis 18 to which the wheels 20,22 are attached is slightly different in configuration from the corresponding portion to which the wheels 24,26 are attached, it will be seen that an explanation of mounting details for one of the wheels 20-26 will suffice for all four. In this regard, then, and using the wheel 20 as an example, the latter includes a bracket 28 attached to adjacent structure of the jack 10 in the form of a relatively flat member 30 for swivelling movement about a normally upright axis defined by a bolt 32. In actuality, the bracket 28 is constructed in two main parts, having an upper part 34 fixed to the bolt 32 and clamped against the underside of member 30 by a nut 36 on the bolt 32, and a lower part 38 connected to the upper part 34 in such a way that the lower part 38 swivels relative to upper part 34 about the axis of bolt 32.

The lower part 38 is bifurcated, having a pair of depending furcations 40 and 42 interconnected at their upper ends by a bight 44 and situated on opposite sides of the roller wheel 46 of that particular wheel 20. The furcations 40 and 42 support the roller wheel 46 for rotation about a horizontal axis defined by bolt assemblies 48 and 50 projecting outwardly from opposite sides of the roller wheel 46 and the furcations 40,42. Bight 44 is spaced radially above the peripheral surface of the roller wheel 46 such as to avoid inhibiting engagement with the latter, such relationship producing a space 51 defined between the wheel 46, the furcations 40,42 and the bight 44.

In accordance with the principles of the present invention, a lock 52 forming a part of what may be referred to as a swivel lock and tow bar assembly may be attached to the wheel 20 to temporarily fix the latter in a straight-forward direction of movement. The lock 52 comprises a unitary, generally U-shaped body having a pair of laterally spaced legs 54 and 56 that are rigidly interconnected at their inner ends by a web 58. The leg 54 is of inverted, transversely U-shaped configuration in the nature of a channel that opens inwardly toward the opposing leg 56 and has a pair of inturned flanges 60,62 along its opposite longitudinal edges. Additionally, the leg 54 is provided with a longitudinal slot 64 leading inwardly from the outer end 54a thereof and terminating in an arcuate terminus 66 short of the leg's inner end 54b, the slot 64 being symmetrically disposed with respect to the two flanges 60,62.

The opposite leg 56 is in the nature of a rigid, flat tongue of substantially reduced width compared to the leg 54 and attached to the latter via web 58 closer to the flange 62 than the flange 60 at the point of attachment. The leg 56 is generally in the shape of a parallelogram when viewed in plan as in FIG. 4, having a pair of opposite side edges 68 and 70 that extend obliquely with respect to the central, longitudinal axis of the leg 54 generally from the flange 62 toward the opposite flange 60 as the outer end 56a is approached. End 56a is substantially parallel to the end 54a of leg 54 but is set back with respect thereto. Furthermore, as shown perhaps most clearly in FIG. 2, the leg 56 converges toward the leg 54 as the web 58 is approached.

The other part of the swivel lock and tow bar assembly comprises a handle or tow bar 72 having a generally T-shaped body and a yoke 74 at one end thereof. The yoke 74 is bifurcated, having a pair of arms 76 and 78 that are interconnected at their inner ends by a bight 80 which is in turn attached to the T-shaped body. Spaced inwardly from the outermost ends 76a and 78a of arms 76,78 are a pair of transversely aligned notches 82 and 84, each of which extends transversely inwardly from its corresponding, normally lower longitudinal edge 76b or 78b of arms 76,78.

In use, the lock 52 is preferably slipped onto the member 30 of wheel 20 in the manner illustrated in FIGS. 1, 2 and 3, the flat, rectangular configuration of the member 30 permitting the latter to be matingly received within the channel formed by the leg 54 of lock 52. Note that the slot 64 in leg 54 clears the upstanding projection defined by the bolt 32 and nut 36 as the leg 54 is slipped endwise onto the member 30.

As the lock 52 is installed, the tongue formed by leg 56 slips into the space 51 between the furcations 40,42 and above the roller wheel 46. Inasmuch as the tongue leg 56 is disposed at an oblique angle to the longitudinal axis of the retaining leg 54, the roller wheel 46 is likewise oriented obliquely with respect to the axis of the leg 54 in what has previously been referred to as a straight-forward position. In view of the fact that the tongue leg 56 is rigid to the retaining leg 54 and the latter is firmly held in place on the member 30, the tongue leg 56 prevents the lower part 38 of the bracket 28 from swivelling about the axis of bolt 32 with the roller wheel 46. Hence, the roller wheel 46 has no choice but to roll only in the straight-forward direction as illustrated in FIG. 1.

The handle or tow bar 72 is attached to either of the oppositely trailing or leading wheels 24,26. All that is required in this regard is for the notches 82,84 of the yoke 74 to be slipped downwardly over the lateral projections defined by the bolt assemblies 48,50, whereupon the tow bar 72 and the yoke 74 will be interconnected in a way that swivelling of the wheel 24 relative to the tow bar 72 is precluded. Such interconnection permits the tow bar 72 to be raised and lowered by the user grasping the outermost end of the same and pivoting the yoke 74 about the bolt assemblies 48,50 and, furthermore, permits the user to determine the direction of advancement of the wheel 24 by simply shifting the tow bar 72 in the necessary lateral direction.

With the lock 52 and the tow bar 72 thus installed, the jack 10 has been rendered readily steerable by a user grasping the outermost end of the tow bar 72. Upon the application of a pushing force by the user to the tow bar 72 with the latter oriented in the manner illustrated in FIG. 1, the jack 10 will pivot about the locked wheel 20. In this regard, the wheel 24 will be oriented to roll in a direction corresponding to the longitudinal axis of the tow bar 72, and upon first movement of the wheel 24 in this direction, its next adjacent wheel 26 will quickly swivel approximately 180° in a "slaving" manner into orientation such that the horizontal axis of rotation trails directly behind its vertical axis of swinging movement. The slaved relationship presented is maintained throughout continued use of the two bar 72 so long as the general direction in which the wheel 24 is maneuvered is maintained the same. Upon reversal of course, the free to castor reverses its position, but still in slaved relationship to the fixed wheel. Wheel 26 will always align itself so that its effective path of travel is parallel to that of the wheel 24.

Likewise, the wheel 22 becomes "slaved" to the wheel 20 and remains substantially parallel thereto throughout movement of the jack 10, although it will be noted that during the pivoting action above explained about the point of contact between the wheel 20 and the floor, the wheel 22 adjusts itself slightly so as to move in an arcuate path of travel about the wheel 20.

If the tow bar 72 is swung clockwise from its position illustrated in FIG. 1 until it essentially parallels the locked path of travel of the wheel 20, and if the user then pushes along the tow bar 72 in the direction of its longitudinal axis, the jack 10 will move in a straight-forward direction in which all four of its wheels 20-26 have parallel lines of travel. Such direction of travel will be maintained, notwithstanding surface irregularities encountered by the wheels 20-26 because the wheel 20 cannot respond to such irregularities, nor can the wheel 24. And, as we have seen, the remaining wheels 22 and 26 are subserviant to their respective wheels 20 and 24.

As a result of the foregoing, the jack 10 is rendered extremely steerable and precisely positionable such that the mechanic can readily cope with the close, low overhead quarters within which he must precisely maneuver and manipulate the heavy truck component. Moreover, the lock 52 and the tow bar 72 may be quickly attached and removed as may be necessary or desirable.

I claim:

1. A jack assembly for use in connection with the installation, removal and service of heavy transmissions, differentials and related components from the underside of heavy-duty service trucks and the like comprising:
a generally horizontal platform operable to support said heavy truck components or the like during said installation, removal or service;
four rotatable support caster wheels for said platform;
means mounting the caster wheels on the underside of the platform in essentially a common horizontal plane and in disposition for independent normally free swiveling movement of each about a corresponding upright axis spaced from the axes of swiveling of the remaining caster wheels;
loading means releasably engageable with the mounting means for one of the caster wheels and operably to fixedly couple such mounting means to the platform to lock said one wheel against swiveling without in any way interfering with its ability to roll freely along a supporting surface; and
a steering handle releasably attached to the mounting means for an oppositely trailing or leading wheel with respect to the path of travel of the jack assembly and operable when manipulated to turn the mounting means to which it is connected, about the upright axis of swivelling thereof without interfering with the free ability of the wheel supported thereon to roll freely along a supporting surface,
said jack assembly being maneuverable by pushing or pulling on the steering handle while turning such handle as may be necessary to cause the platform to properly receive and support a heavy truck component such as a transmission, differential or the like as it is released from a vehicle and in like manner, allow precise and extremely accurate repositioning when the component is reattached because mounting belts and their receiving holes require exact alignment before replacement is possible.

2. In the combination as claimed in claim 1, wherein said mounting means for said opposite wheel is provided with lateral projections on opposite sides thereof, said handle including a yoke at one end thereof embracing said opposite wheel and coupled with said projections.

3. In the combination as claimed in claim 2, wherein said yoke includes a pair of arms interconnected at one end by a bight, each of said arms having a transversely opening notch disposed to receive a corresponding one of said projections.

4. In the combination as claimed in claim 1, wherein each of said wheels includes a roller wheel and said mounting means is provided with a bracket attached to adjacent structure of said platform for swivelling movement about a respective normally upright axis, said bracket being bifurated, presenting a pair of laterally spaced furcations situated on opposite sides of the roller wheel and interconnected by a bight disposed in radially spaced relation to the roller wheel, said releasable locking means including a rigid tongue interposed between said furcations, the bight, and the roller wheel and held by said structure against movement relative thereto.

5. In the combination as claimed in claim 4, wherein said structure includes an elongated, relatively flat member, said releasable locking means further including an inverted, generally transversely U-shaped, downwardly opening channel receiving said member between laterally spaced, depending flanges thereof, said tongue being rigidly affixed to a normally outer end of the channel and projecting downwardly and thence inwardly into position between said furcations of the bracket.

6. A swivel lock as set forth in claim 1, wherein said mounting means for attaching each of said wheels to the platform includes structure that supports a bracket of the wheel for swivelling movement about a normally upright axis, said bracket being bifurcated, presenting a pair of laterally spaced furcations situated on opposite sides of a roller of the caster wheel and interconnected by a bight disposed in radially spaced relation to the roller, said lock comprising:
a rigid tongue adapted for insertion into the space defined between said furcations, the roller and said bight; and
means for holding said tongue against movement relative to said structure whereby to preclude said swivelling movement of the bracket and its roller.

7. A swivel lock as claimed in claim 6, wherein said structure includes a flat member, said holding means including an inverted, generally U-shaped channel rigid to said tongue and adapted to removably and matingly receive said member.

8. A swivel lock as claimed in claim 6, wherein said lock is in the form of a generally U-shaped, unitary body having a pair of rigidly interconnected, laterally spaced legs, one leg comprising said tongue and the other leg comprising an inverted, generally U-shaped, elongated channel opening toward said tongue and forming said holding means.

9. A swivel lock as claimed in claim 8, wherein said channel is provided with a longitudinal slot extending inwardly from an outer end thereof, said slot being adapted to receive an upright projection on said structure of the device when the lock is installed.

10. A swivel lock as claimed in claim 8, wherein said tongue extends obliquely with respect to the longitudinal axis of the channel.

* * * * *